United States Patent
Kataoka et al.

(10) Patent No.: US 7,122,133 B2
(45) Date of Patent: Oct. 17, 2006

(54) FINELY PARTICULATE FUNCTIONAL METAL AND FINELY PARTICULATE FUNCTIONAL SEMICONDUCTOR EACH WITH DISPERSION STABILITY AND PROCESS FOR PRODUCING THE SAME

(75) Inventors: Kazunori Kataoka, Tokyo (JP); Yukio Nagasaki, Ibaraki-ken (JP); Hidenori Otsuka, Kanagawa-ken (JP); Takehiko Ishii, Saitama-ken (JP)

(73) Assignee: Japan Science & Technology Agency, Saitama (JP)

( * ) Notice: Subject to any disclaimer, the term of this patent is extended or adjusted under 35 U.S.C. 154(b) by 304 days.

(21) Appl. No.: 10/363,053

(22) PCT Filed: Feb. 14, 2001

(86) PCT No.: PCT/JP01/01039

§ 371 (c)(1),
(2), (4) Date: Feb. 28, 2003

(87) PCT Pub. No.: WO02/20200

PCT Pub. Date: Mar. 14, 2002

(65) Prior Publication Data

US 2004/0038506 A1    Feb. 26, 2004

(30) Foreign Application Priority Data

Sep. 8, 2000   (JP) .............................. 2000-273131

(51) Int. Cl.
  *C08K 3/08* (2006.01)
  *C08K 9/04* (2006.01)
  *B01J 13/00* (2006.01)
  *B22F 9/18* (2006.01)
  *A61K 49/04* (2006.01)

(52) U.S. Cl. ................... 252/514; 252/518.1; 252/500; 252/301.4 R; 977/813; 977/840; 435/320.1; 424/9.3; 424/9.4

(58) Field of Classification Search ............... 252/500, 252/503, 518.1, 301.4 R, 514; 106/1.12, 106/1.13, 1.15; 423/510; 977/840, 813, 977/700, 773; 424/9.3, 9.4; 435/320.1; 516/96, 97; 438/584, 738

See application file for complete search history.

(56) References Cited

U.S. PATENT DOCUMENTS 4,650,985 A * 3/1987 Okibayashi et al. ..... 250/214.1
6,099,897 A * 8/2000 Sayo et al. .................. 427/180

FOREIGN PATENT DOCUMENTS

| DE | JP 10-073594 | * | 3/1998 |
| EP | 0 489 465 A2 | | 6/1992 |
| JP | 59-222223 | * | 12/1984 |
| JP | EP 858854 A1 | * | 1/1998 |

OTHER PUBLICATIONS

Akiyama et al, "Synthesis of heterobifunctional poly(ethylene glycol) possessing a mercapto group at one end and an acetal group at the other end, and preparation of the functional gold particles," Polymer Preprints, Japan, 18999, 48(14), pp. 4113-4114.*

Bartz et al., "Monothiols derived from glycols as agents for stabilizing gold colloids in water: synthesis, . . . ", J. Mater. Chem., 1999, 9, pp. 1121-1125.

Wuelfing et al., "Nanometer Gold Clusters Protected by Surface-Bound Monolayers of Thiolated . . . ", J. Am Chem Soc. 1998, 120, pp. 12696-12697.

Templeton et al., "Monolayer-Protected Cluster Molecules", Acc. Chem, Res. 2000, 33, pp. 27-36.

* cited by examiner

Primary Examiner—Mark Kopec
Assistant Examiner—Kallambella Vijayakumar
(74) Attorney, Agent, or Firm—Sherman & Asoociates

(57) ABSTRACT

A stabilized dispersion of metal fine particles comprising, fine particles of metal which is obtained by reducing at least one metallic acid or salt thereof selected from the group consisting of haloauric acid, haloplatinic acid, silver nitrate and halorhodic acid by a reducing agent in the aqueous solution of (1) R-PEG-SX [R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is $-(CH_2CH_2O)_n-$, X is H or pyridylthio group] or (2) R-PEG/PAMA (given structural formula A), and said fine particles load a polymer having PEG unit possessing above mentioned functional group on the surface.

13 Claims, 8 Drawing Sheets

(a)

(b)

FINELY PARTICULATE FUNCTIONAL METAL AND FINELY PARTICULATE FUNCTIONAL SEMICONDUCTOR EACH WITH DISPERSION STABILITY AND PROCESS FOR PRODUCING THE SAME

FIELD OF THE INVENTION

The present invention relates to a stabilized dispersion of metal fine particles having high functional group at the voluntarily end of a compound having a PEG unit mentioned below, block copolymer having said PEG unit and unit of structural formula A or graft polymer of structural formula B, obtained by existing a compound having a PEG unit which possesses a functional group disclosed in claim 1, a compound having a PEG unit which possesses a functional group disclosed in claim 3 and block polymer of structural formula A or graft polymer of structural formula B having a PEG unit which possesses a functional group disclosed in claim 5 during the producing process of monodispersed metal or semiconductor fine particles (colloidal particles), further relates to the method for production of said stabilized dispersion of metal fine particles.

BACKGROUND OF THE INVENTION

In general, metal or semiconductor colloid (ultra fine particle) is an important industrial material which is broadly used in various fields, for example, medical treatment [as a medicine (medicine of ultra fine particles having penetrating ability to membrane internus), various inspection agents or DDS], dye (coating), foods or catalyst. Especially, metal particles of several tens to several hundreds nano meter size (called as submicron: meso size) and having narrow distribution is expected as a high functional materials such as diagnostic which uses Raman spectrum or microwave or a labeling agent for electron microscope.

For example, Assay method, which uses colloidal metal particles has been developed. Said method is characterized as follows. That is, since colloidal metal is used as a label, the specific bonding site to be labeled is bonded on colloidal metal by absorption and said labeling material is detected and measured (JP Laid Open Publication 6-116602, hereinafter shortened to Document A).

The principle can be illustrated as follows. That is, it becomes well known that the ultra fine particles can enhance the resonance Raman scattering by a surface sensitizing effect (Surface Enhanced Raman Scattering, Surface Enhanced Resonance Raman Scattering; SERRS), further, it is found out that colloidal metal displays said signal sensitizing effect, therefore, the special characteristics of said colloidal metal is utilized.

As mentioned above, when colloidal metal which displays above mentioned effect to Raman rays is used as the labeling agent, various detecting subject which reacts with colloidal metal, for example, an antibody or a ligand can be detected using above mentioned effect. Sill more, it is possible to detect the subject to be detected using Raman ray in good sensitivity by bonding a material having a specific bonding site or a Raman sensitizing substance (i.e. colloidal metal) to said subject to be detected, in other word, since by treating a Raman sensitizing substance with an intervening molecule, said substance becomes to have an ability to bond with the subject to be detected, it becomes the labeling material to the subject to be detected.

However, these conventional ultra fine particles of metal is maintaining it's dispersing state by the repulsing forth of surface ions in the medium such as water, therefore, when the substance having opposite electric charge exists, said ultra fine particles of metal are neutralized and cohered, that is, the instability is pointed out as the problem.

In the meanwhile, in above mentioned Document A, the art to prepare a stable sol which does not cause cohesion easily with salt or acid by coating a sol of gold with alkane thiol or thiol derivatives (called as protection or modification) is disclosed. However, the disclosed method for producing is complicated and the obtained sol cannot be said as the monodispersed particles, namely, as the narrow distributed particles, further, the size of obtained particles is relatively larger, therefore, the improvement of an ability is required when used as a detecting reagent.

For the purpose to dissolve said problem and to obtain a dispersion of metal fine particles having various improved characteristics, the method to improve the dispersion stability of metal fine particles based on the repulsing forth of the carried PEG is disclosed [for example, W. P. Wuelfing et al. J.Am.Chem., Soc.120 (48), 12696–12697 (1988)]. Said method can be illustrated as follows, namely; using a polymer having water soluble structure like to polyethyleneglycol (PEG), having high mobility and possessing a functional group which has affinity to metal fine particles on one end, and by loading this polymer to metal fine particles.

However, considering metal fine particles used for a diagnostic, when polymer having PEG structure is loaded on the surface of metal fine particles, although the dispersion stability is improved, the use of it is quite limited because it lacks a reactive group with a group which an antibody has (a group of peculiar reactivity, a group reacts with the group which subject to be detected has).

Aiming to dissolve above mentioned various problems, the inventors of the present invention have already proposed a novel stabilized dispersion complex [48th Polymer Forum (1999) held on October 6–8, at Niigata Univ. Igarashi Campus (Abstract of Polymer Society) Vol.48, No.14, 4113–4114, published on Sep. 20, 1999]. Said novel complex is prepared by synthesizing PEG derivative to one end of which (for example, α-end) a functional group which can load ultra fine particles of metal, metal oxide or semiconductor (for example, mercapt group or polyamine group) is introduced and to another end (ω-end) a functional group which can react with a functional compound i.e., antibody, protein or dye, PEG to which said functional groups are introduced is loaded on ultra fine particles of metal, metal oxide or semiconductor so as to improve the dispersion stability of said ultra fine particles, that is, said novel complex possesses a functional group having reactivity with a functional compound on another end of the PEG chain which spreads (extends) from the surface of ultra fine particles.

In said document, the process to make exist polymer derivatives (called as a polymer modifying agent) having above mentioned PEG structure in the process to produce dispersion of colloidal particle from auric acid chloride and sodium borohydride ($NaBH_4$) as a reducing agent is not discussed. Further, the gold sol particles obtained by the conventional art is far from the monodispersed colloidal particle, still more, is not of satisfying quality from the view point of dispersion stability.

Further, there is no experimental report to prepare ultra fine particles of semiconductor in the presence of polymer derivatives having same PEG structure. The object of the present invention is to improve the defects of above mentioned conventional arts, and is to provide monodispersed fine particles (colloidal particles, nano size particles) of metal such as gold, platinum, silver or rhodium or semiconductor such as CdS, ZnS, CdSe, ZnSe or InAs whose dispersion stability is improved, that is, the dispersion of fine particles whose particle size is uniform and relatively small. Further, the dispersion of fine particles of gold or others (colloidal particles), whose dispersion stability is improved, possesses a block polymer of a graft polymer having a PEG chain or a PEG unit on the surface layer, and by introducing above mentioned functional group to the voluntary ends of said chain or polymer the functions of said functional groups have are provided to the dispersion. Another object of the present invention is to provide a method for producing of above mentioned dispersion.

The inventors of the present invention have carried out intensive study to dissolve above mentioned problem and investigated the reaction system which generate dispersion of metal fine particles (colloidal particles) by good reappearance and stable, and found out that the monodispersed fine particles (colloidal particles) whose dispersion stability is improved can be obtained by generating metal fine particles or semiconductor fine particles by reduction of auric acid chloride under the presence of specific compound (polymer) possessing above mentioned PEG unit, and dissolved above mentioned object.

Furthermore, the inventors of the present invention have found out that fine particles (colloidal particle) dispersion whose dispersion stability is remarkably improved can be obtained by adding block or graft polymer to the solvent of fine particles (colloidal particle) dispersion for gold which is on the market, and monodispersed metal fine particles (colloidal particle) having uniform and small particle size, in other words, of nano size showing quantum effect can be obtained only by mixing metal acid and said block or graft polymer (not necessary to add a reducing agent).

DISCLOSURE OF THE INVENTION

The first one of the present invention is a stabilized dispersion of metal fine particles comprising, fine particles of metal which is obtained by reducing at least one metallic acid or salt thereof selected from the group consisting of haloauric acid, haloplatinic acid, silver nitrate and halorhodic acid by a reducing agent in the aqueous solution of R-PEG-SX [wherein R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is —$(CH_2CH_2O)_n$— (wherein n is an integer from 2 to 10000), X is H or pyridylthio group] and said fine particles load a polymer having PEG unit possessing above mentioned functional group on the surface.

The second one of the present invention, is a method for producing of the stabilized dispersion of metal fine particles comprising, fine particles of metal which is obtained by reducing at least one metallic acid or salt thereof selected from the group consisting of haloauric acid, haloplatinic acid, silver nitrate and halorhodic acid by a reducing agent in the aqueous solution of R-PEG-SX [wherein R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is —$(CH_2CH_2O)_n$— (wherein n is an integer from 2 to 10000), X is H or pyridylthio group] and said fine particles load a polymer having PEG unit possessing above mentioned functional group on the surface.

The third one of the present invention is a stabilized dispersion of metal fine particles comprising, fine particles of metal which is obtained by reducing at least one metallic acid or salt thereof selected from the group consisting of haloauric acid, haloplatinic acid, silver nitrate and halorhodic acid by a reducing agent in the block polymer solution of R-PEG-PAMA [wherein R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is —$(CH_2CH_2O)_n$— (wherein n is an integer from 2 to 10000), PAMA is a polymer of acrylic acid or methacrylic acid possessing an amino group represented by structural formula A] and said fine particles load a polymer having block polymer possessing above mentioned functional group on the surface.

structural formula A

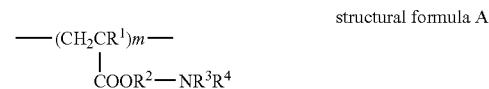

(wherein m indicates degree of polymerization and is 2–10000, $R^1$ is H or methyl group, $R^2$ is alkylene group of carbon number 1–10, $R^3$ and $R^4$ is alkyl group of carbon number 1–5)

The forth one of the present invention is a method for producing the stabilized dispersion of metal fine particles comprising, fine particles of metal which is obtained by reducing at least one metallic acid or salt thereof selected from the group consisting of haloauric acid, haloplatinic acid, silver nitrate and halorhodic acid by a reducing agent in the block polymer solution of R-PEG-PAMA [wherein R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is —$(CH_2CH_2O)_n$— (wherein n is an integer from 2 to 10000), PAMA is a polymer possessing an amino group represented above mentioned structural formula A] and said fine particles load a block polymer possessing above mentioned functional group on the surface.

The fifth one of the present invention is a stabilized dispersion of metal fine particles comprising, fine particles of metal which is obtained by reducing at least one metallic acid or salt thereof selected from the group consisting of haloauric acid, haloplatinic acid, silver nitrate and halorhodic acid by a reducing agent in the graft polymer solution of structural formula B [wherein $R^{12}$ is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, $R^6$, $R^7$, $R^9$, $R^{10}$ is H or lower alkyl group of carbon number 1–5, $R^8$ and $R^{11}$ is respectively a bonding group selected independently from the group consisting of —$COO(CH_2)_y$— (wherein y is an integer of 1–10), —$C_6H_4(CH_2)z$— (wherein z is an integer of 1–10) and —$CONH(CH_2)_w$— (wherein w is an integer of 1–10), X indicates degree of polymerization and is 2–100, $R^5$ is a fragment of initiator generates at the synthesis] and said fine particles load said graft polymer chain possessing above mentioned functional group on the surface.

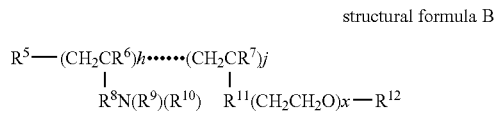

structural formula B

The sixth one of the present invention is the method for producing the stabilized metal fine particles dispersion comprising, fine particles of metal which is obtained by reducing at least one metallic acid or salt thereof selected from the group consisting of haloauric acid, haloplatinic acid, silver nitrate and halorhodic acid by a reducing agent in the graft polymer solution of structural formula B [wherein $R^{12}$ is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, $R^6$, $R^7$, $R^9$, $R^{10}$ is H or lower alkyl group of carbon number 1–5, $R^8$ and $R^{11}$ is respectively a bonding group selected independently from the group consisting of —COO(CH$_2$)$_y$— (wherein y is an integer of 1–10), —C$_6$H$_4$(CH$_2$)z— (wherein z is an integer of 1–10) and —CONH(CH$_2$)$_w$— (wherein w is an integer of 1–10), X indicates degree of polymerization and is 2–100] and said fine particles load said graft polymer chain possessing above mentioned functional group on the surface.

In the stabilized metal fine particles dispersion of the invention of above mentioned 1, 3 and 5, halogenated metallic acid or salt thereof is desirably haloauric acid, haloplatinic acid, halorhodic acid or acid thereof, further in the method for producing of the stabilized metal fine particles dispersion of the invention of above mentioned 2, 4 and 6, halogenated metallic acid or salt thereof is desirably haloauric acid, haloplatinic acid, halorhodic acid or acid thereof The seventh one and eighth one of the present invention are a stabilized dispersion of semiconductor fine particles comprising, fine particles of semiconductor of MeS, CdSe or InAs obtained by heating at least one compound represented by MeX$_2$ (Me is Cd or Zn and X is halogen) and tributylphosphine under the presence of trioctylphosphineoxide, or reacting (CH$_3$)$_3$SiAs, InCl$_3$ and trioctylphosphine by heating, in the solution of block polymer represented by R-PEG-SX [R is a functional group except SH, PEG is —(CH$_2$CH$_2$O)$_n$— (wherein n is an integer from 2 to 10000) and X is H or pyridylthio group]or R-PEG/PAMA [wherein R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is —(CH$_2$CH$_2$O)$_n$— (wherein n is an integer from 2 to 10000) and PAMA is a polymer possessing an amino group represented above mentioned structural formula A], or graft polymer represented by above mentioned structural formula B and a method for preparation of said stabilized metal fine particles dispersion. In the seventh and eighth inventions, fine particles of semiconductor is desirably CdS, CdSe, ZnS, ZnSe or InAs.

BRIEF ILLUSTRATION OF THE DRAWINGS

Figure 3:
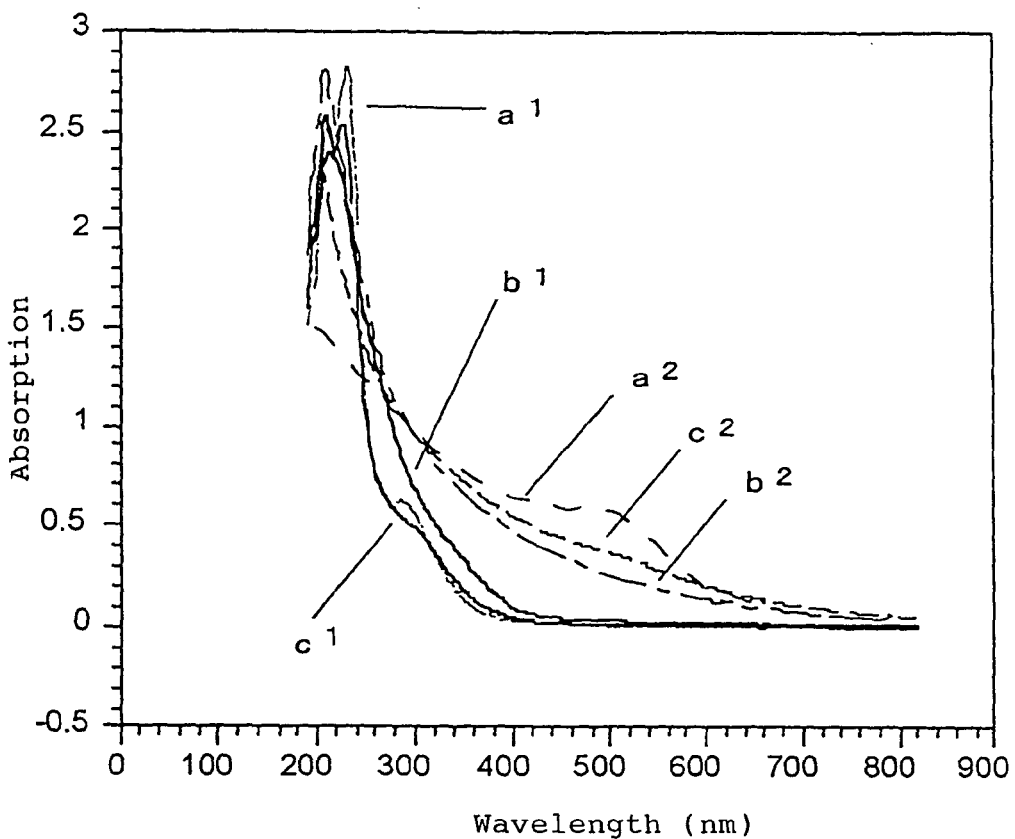

FIG. 3 shows the preparation process of dispersed and stabilized colloidal gold particles (fine particles) by reducing auric acid chloride (HAuCl$_4$:Au) with acetal-PEG-SH (PEGSH:PEG) and reducing agent NaBH$_4$ ($a^1$ is Au:PEG=1:1/6 before reduction, $a^2$ is after reduction. $b^1$ is Au:PEG=1:1/3 before reduction, $b^2$ is after reduction, $c^1$ is Au:PEG=1:1 before reduction, $c^2$ is after reduction).

Figure 4:
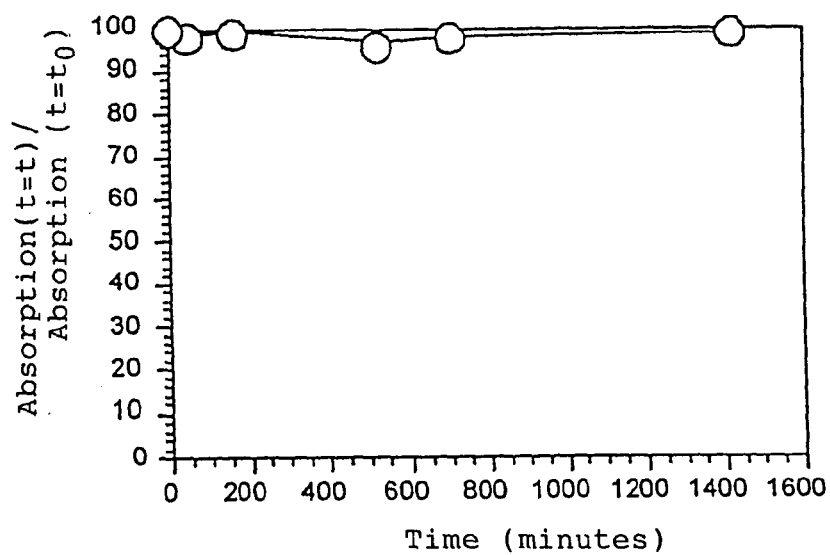

FIG. 4 shows the graph of stability of dispersion of gold fine particles obtained in FIG. 3 in phosphoric acid buffering solution of ionic strength 0.15M.

Figure 5:
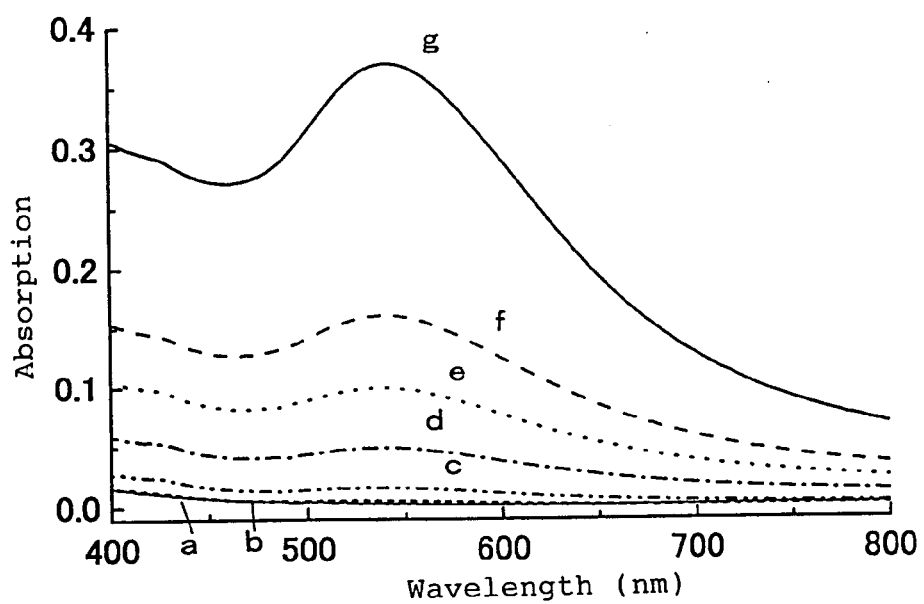

FIG. 5 shows the generation process of dispersion of colloidal gold particles (fine particles) by reducing auric acid chloride with acetal-PEG-PAMA block copolymer (a is at the initiation, b is after 15 minutes, c is after 30 minutes, d is after 45 minutes, e is after one hour, f is after 2 hours and g is after 24 hours).

Figure 6:
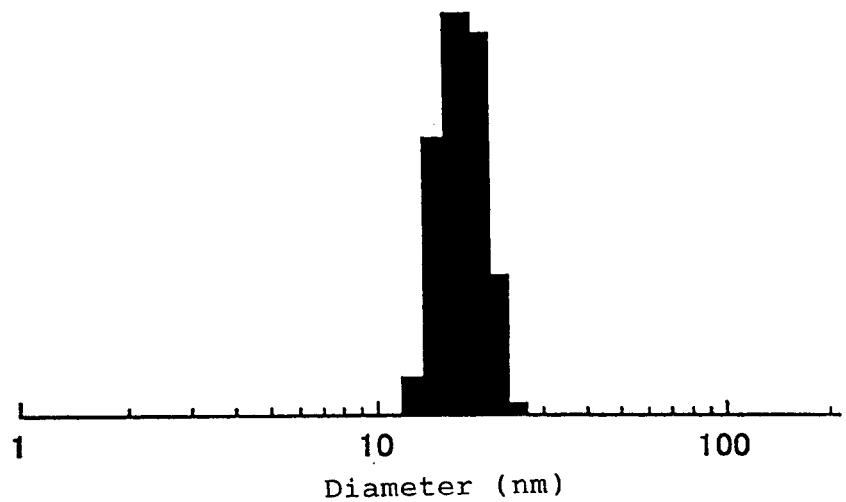

FIG. 6 shows the particles distribution of colloidal gold particles (fine particles) obtained by reducing auric acid chloride with acetal-PEG/PAMA block copolymer (average particle sizes d=18.6).

Figure 7:
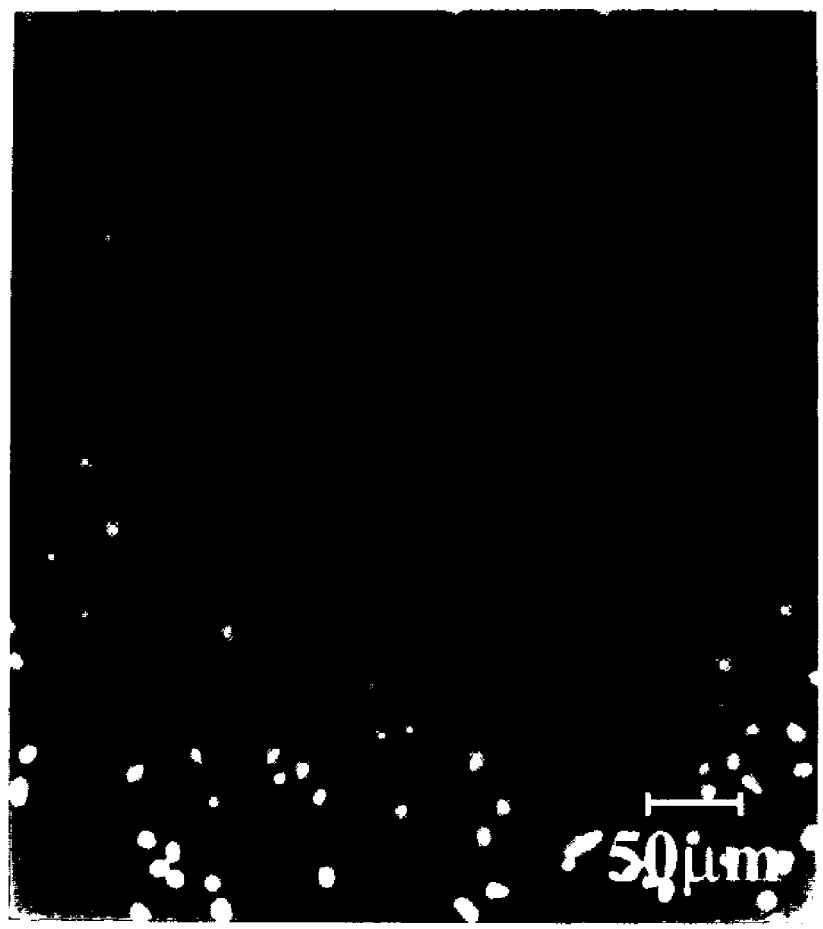

FIG. 7 shows the microscopic image (picture) of stability of colloidal gold particles (fine particles) obtained by reducing auric acid chloride with acetal-PEG-PAMA block copolymer.

Figure 8:
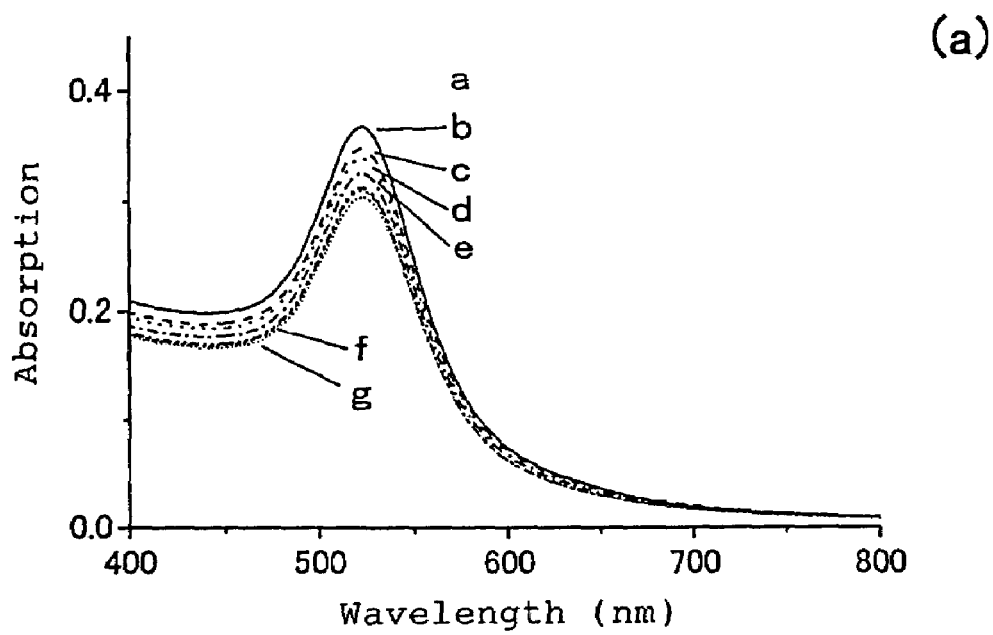
Figure 8:
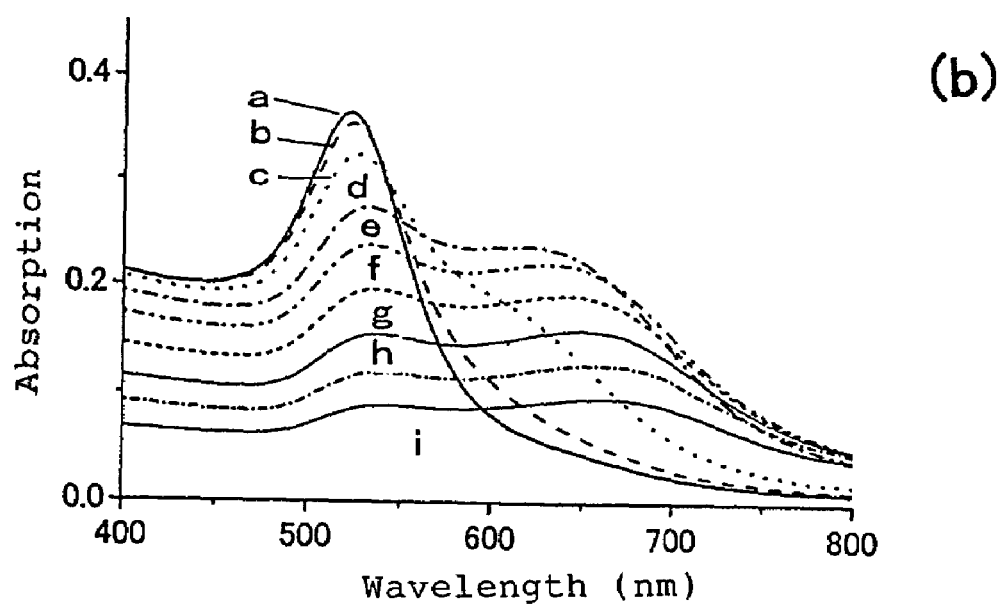

FIG. 8(a) shows the effect of stabilization at the acidic condition of colloidal gold particles (fine particles) on the market by acetal-PEG-PAMA block copolymer. FIG. 8(b) shows dispersion stability of colloidal gold by PEG homopolymer in the acidic condition.

Figure 9:
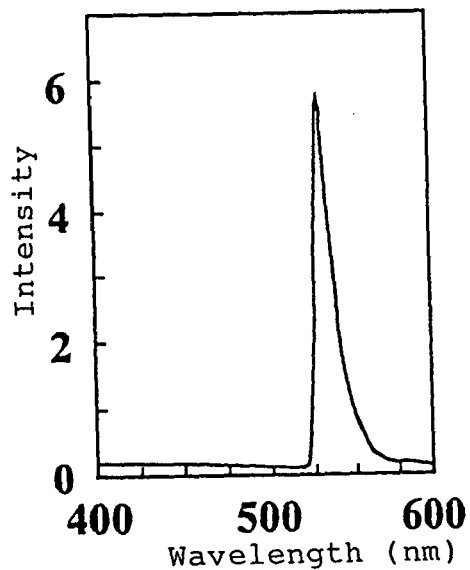

FIG. 9 shows the fluorescence spectrum of CdS quantum dot composed of CdS fine particles formed under the presence of acetal-PEG-PAMA block copolymer.

Figure 10:
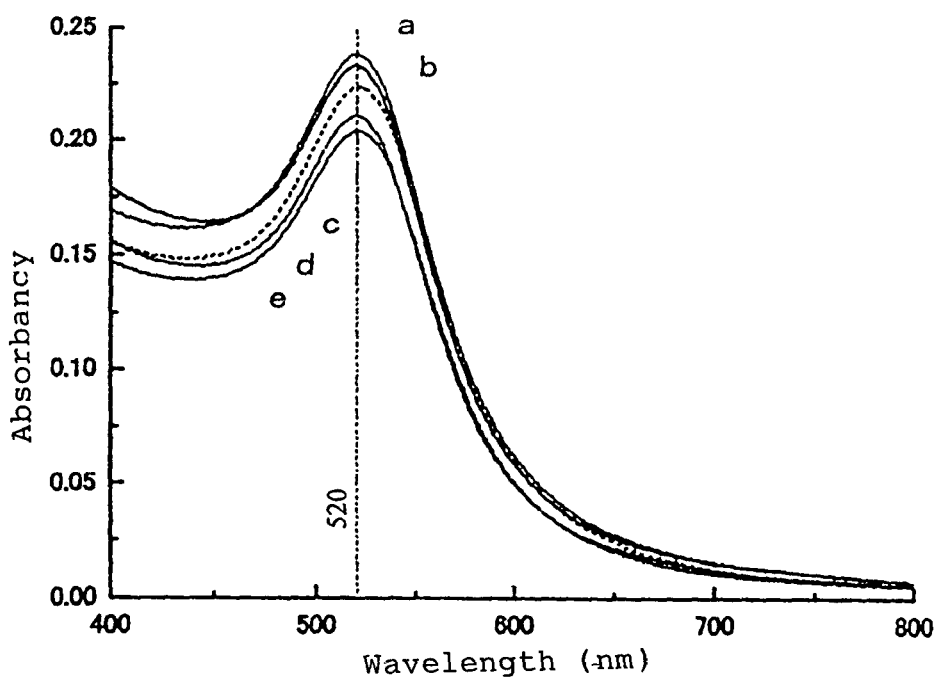

FIG. 10 shows the photo absorption characteristics of gold nano particles prepared by reducing HAuCl$_4$ (Au) using the solution dissolving graft polymer (N) represented by structural formula B, wherein, $R^5$ is a group formed by fragrant of polymerization initiator, $R^6$, $R^7$, $R^9$ and $R^{10}$ is methyl group, $R^8$ is —(CH$_2$)$_2$—, h is 500, J is 3–4, $R^{11}$ is —C$_6$H$_4$—(CH$_2$)$_2$—, $R^{12}$ is carboxyl group and molecular weight is 6400 [a indicates the case of Au and N ratio is 1/8, b indicates 1/16, c indicates 1/32, d indicates 1/64, e indicates 1/128].

Figure 11:
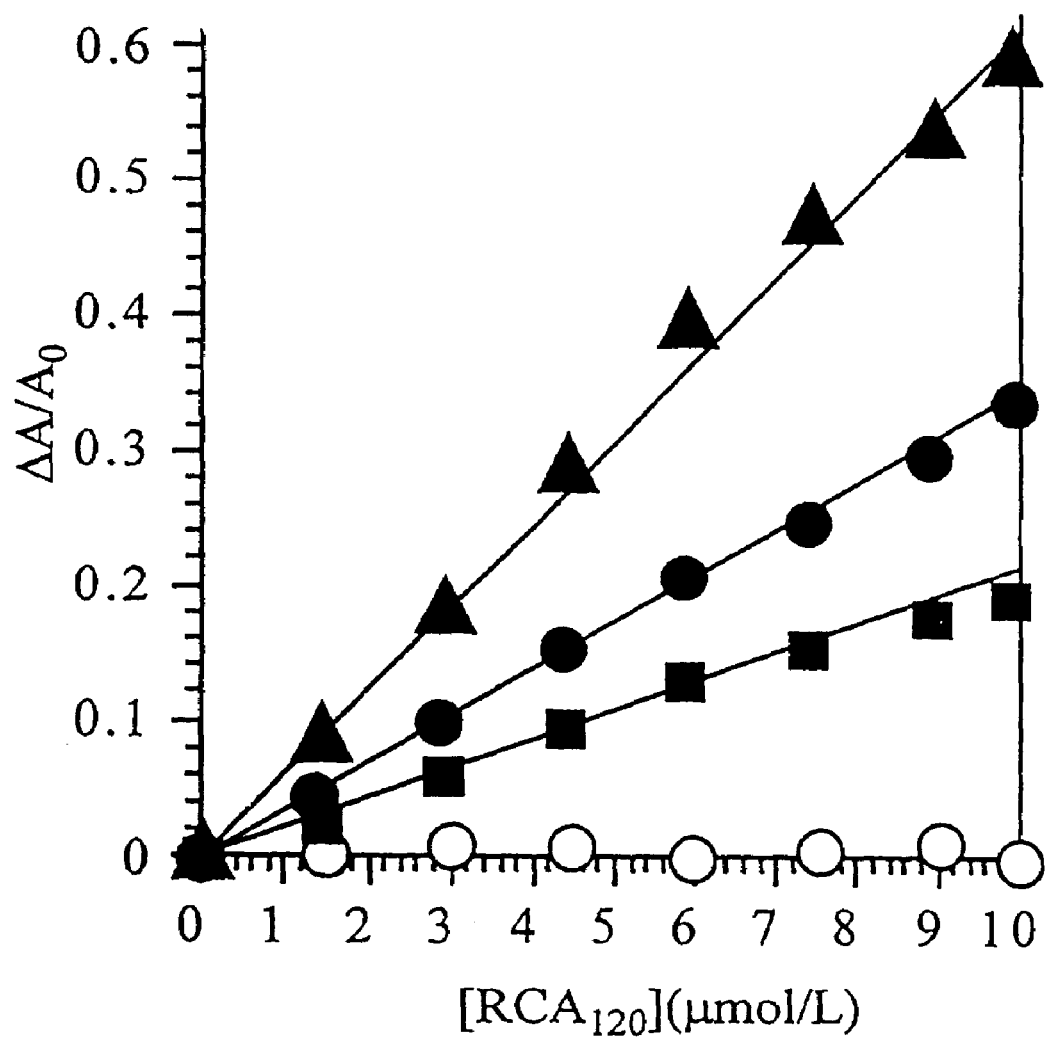

FIG. 11 shows the absorbance observation results of cohesion characteristic by RCA120 lectin (mannose ○ is comparative specimen) [■ indicates after 3 hrs., ● indicates after 8 hrs., ▲ indicates after 24 hrs.].

THE BEST EMBODIMENT TO CARRY OUT THE INVENTION

The present invention will be illustrated more in detail.

A. Functional group -PEG-SX- used in the present invention, in particular, -PEG-S in acetal-PEG-SX- is well known in the concerned field (Japanese Patent Laid Open Publications 11-322917 and 7-48449), and can voluntarily select and use from the disclosed compounds in these documents. Although there are no upper limit in the molecular weight of above mentioned PEG, generally, the compound having larger molecular weight than 100 is used. Desirable molecular weight is 200–100000, more desirable molecular weight is 300–20000.

Further, as a functional group except acetal, aldehyde, hydroxyl group, amino group, carboxyl group, active ester group, azide group, biotin group, monosaccharide, oligosaccharide such as disaccharide, amino acid, nucleic acid, allyl group, vinyl benzyl group, methacryloyl group and acryloyl group can be mentioned, and these groups can be introduced by voluntarily means during or after synthesis process of PEG.

The peculiarity of the present invention is to obtain metal fine particles (colloidal particles) by reducing auric acid chloride or others, existing a compound having above mentioned PEG unit or existing a block polymer or a graft polymer compound at the producing process of metal fine particles (colloidal particles) [in the case of compound having a PEG unit, sodium borohydrate ($NaBH_4$) is coexisted as a reducing agent], or to obtain semiconductor fine particles whose dispersion stability is improved by synthesizing semiconductor fine particles under the presence of a compound having above mentioned PEG unit or existing a block polymer or a graft polymer compound.

In this connection, in the Document A mentioned above, $HAuCl_4$ trihydrate and sodium borohydrite are used, however, the technique to combine these compounds with above mentioned polymer compound, which is the important point of the present invention, is not suggested.

B. Acetal-PEG-dimethylaminoethylpolymethacrylate (PAMA) block copolymer [ethyl group of said copolymer can be voluntarily selected from alkylene group of carbon number 1–10, and methyl group can be voluntarily selected from alkyl group of carbon number 1–5] used in the present invention can be obtained by polymerizing dimethylaminoethyl polymethacrylate to acetal-PEG-OH [PEG is $(CH_2CH_2O)_n$ (n is a voluntary integer number from 2 to 10000)] so as the degree of polymerization to be 2–10000 (acrylic acid can be used instead of methacrylic acid).

One example of synthesis is mentioned below.

Figure 1:
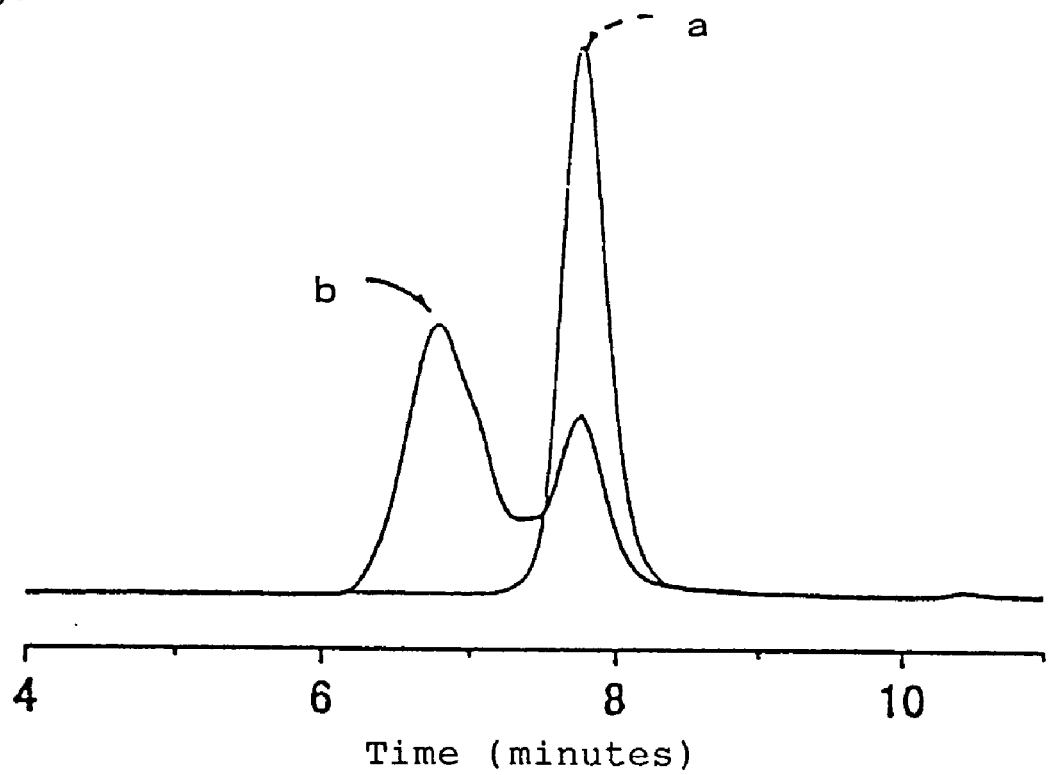
FIG. 1 shows the GPC (gel permeation chromatography) of PEG (a, number-average molecular weight Mn=5700, molecular weight distribution Mw/Mn=1.08) and acetal-PEG-dimethylaminoethylpolymethacrylate (PAMA) block copolymer (b. Mn=21600, Mw/Mn=1.23).

THF (tetrahydrofuran) is poured into a reacting vessel under the argon flow, then 3,3-diethoxy-1-propanol (1 mmol, 0,16 mL) (initiator) is dropped with constant stirring. Naphthyl$^-$K$^+$THF solution of equivalent molar quantity to the initiator is dropped and carries out metalation for 15 minutes. After that, ethylene oxide (EO) (100 mmol, 5.6 mL) is added and polymerization is continued with stirring while cooling by water. The degree of polymerization (length of chain) is measured by GPC (gel permeation chromatography) by random sampling (results are mentioned in FIG. 1; average molecular weight is 5700, average molecular weight of block copolymer is 21600), DMAEMA (dimethylaminoethylmethacrylate) (20 mmol, 3.4 mL) is added and polymerized at room temperature with constant stirring for 20 minutes then the polymerization is stopped by adding excess $H_2O$.

Figure 2:
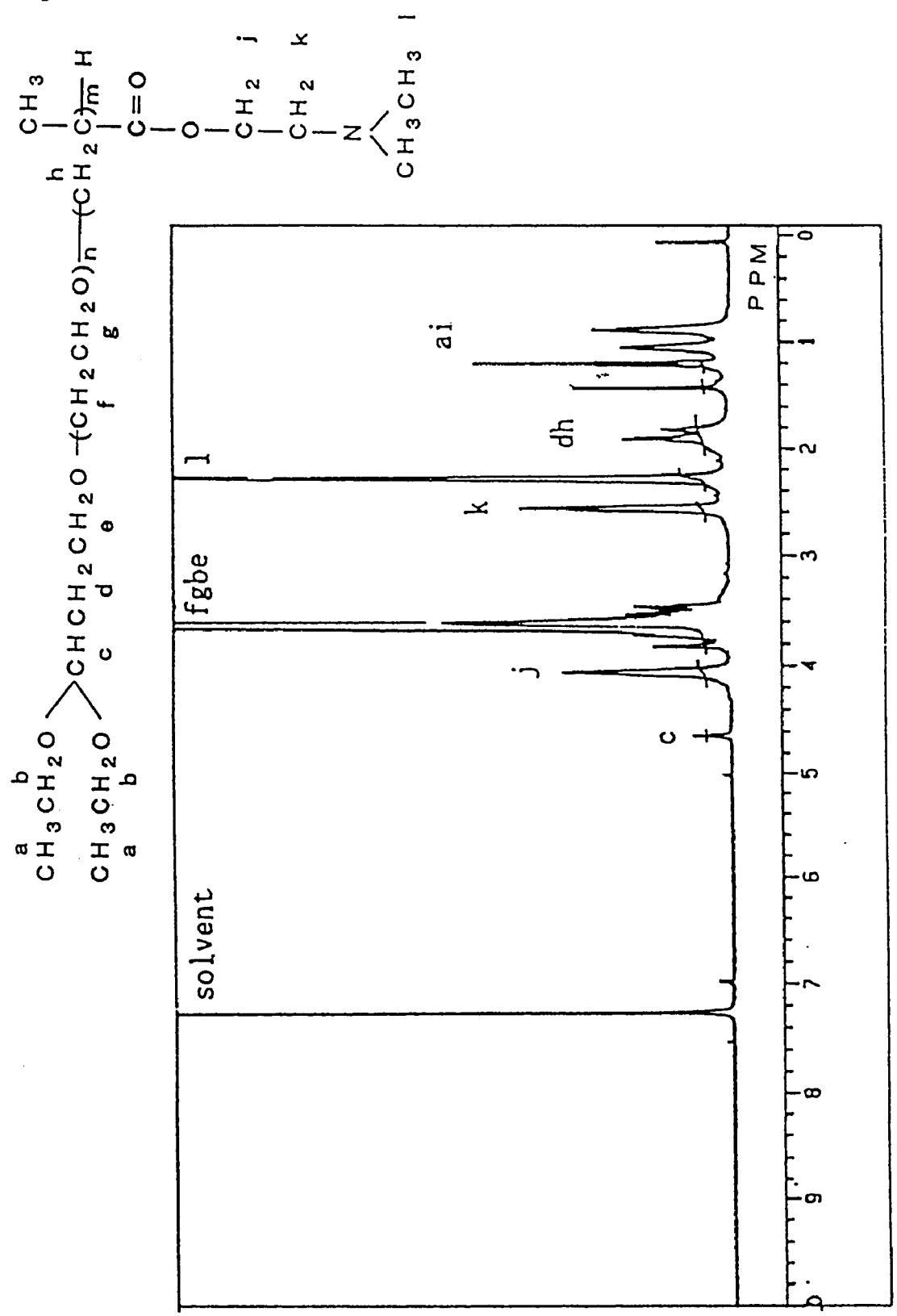
FIG. 2 shows the NMR spectrum of acetal-PEG-dimethylaminoethyl polymethacrylate (PAMA) block copolymer.

Then reprecipitated by cooled 2-propanol and centrifuged (5000 rpm, 60 minutes) and the recovered polymer is lyophilized by benzene. The NMR spectrum of the obtained block copolymer is shown in FIG. 2.

Above mentioned reaction can be illustrated by following Reaction Formula 1.

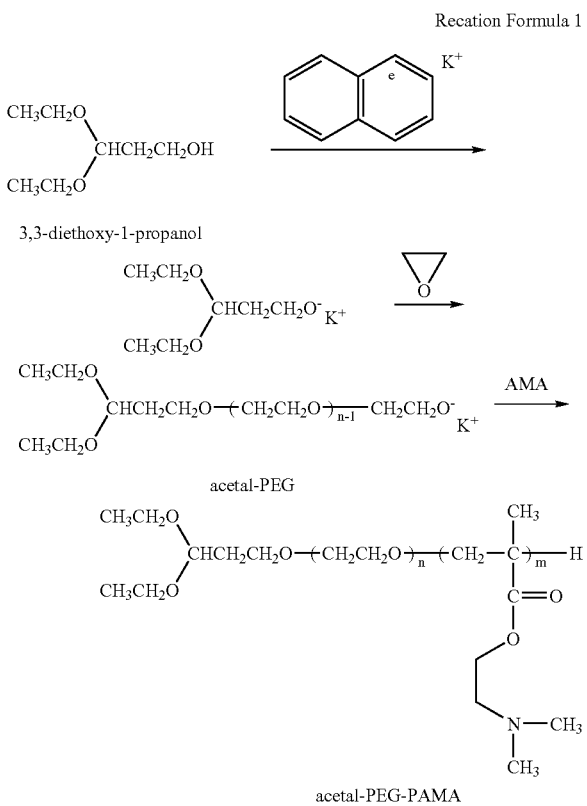

Recation Formula 1

The characteristic of this block copolymer is that the polymer itself has a property to reduce auric acid chloride ($HAuCl_4$) or others, and this is an unexpected effect. Therefore, by use of this block copolymer, it become possible to obtain a stable dispersion of fine particles (colloidal particles) of gold or others only by stirring it with $HAuCl_4$. That is, by use of this block copolymer, $HAuCl_4$ can be reduced without using conventional reducing agent (called as auto reduction).

As a functional group except acetal which provides various functions to dispersion of fine particles of metal, aldehyde, hydroxyl group, amino group, carboxyl group, active ester group, azide group, biotin group, monosaccharide, oligosaccharide such as disaccharide, amino acid, nucleic acid, allyl group, vinyl benzyl group, methacryloyl group and acryloyl group can be mentioned. These functional groups can be introduced by proper means at the process for synthesis of PEG or after the preparation of block. The stabilization of gold is guessed to be caused by coordination of non covalent electron pair of block copolymer to colloidal gold.

Other compounds represented by above mentioned structural formula A can be produced same to the producing method of said block polymer.

C. As the further unexpected effect, it becomes clear that the stabilized dispersion of colloidal gold particles can be produced only by adding (only by stirring) above mentioned acetal-PEG-dimethylaminoethyl polymethacrylate (PAMA) block copolymer to dispersion of colloidal gold particle, which is on the market.

D. The graft polymer possessing a side chain of amino group represented by above mentioned structural formula B and a branch having a PEG unit can introduce at least one above mentioned branch by polymerizing monomer having amino group, under the presence of a PEG macro monomer which can be a branch.

Said macro monomer can be obtained by anionic polymerization under the presence of alkali metal naphthalene.

E. Equally to the polymer represented by structural formula A, the polymer represented by structural formula B has a characteristic to generate fine particles (nano particles) of gold or others having dispersion stability by reducing auric acid chloride without using conventional reducing agent.

F. Not only auric acid chloride ($HAuCl_4$), but also $H_2PtCl_6$, $Na_2PtCl_3$ or silver nitrate can be used for the production of dispersion of fine particles (nano particles).

G. Above mentioned R-PEG-SX, R-PEG/PAMA and polymer represented by structural formula B are useful for the stabilization of semiconductor fine particles. Said stabilized semiconductor fine particles can be prepared by mixing and reacting $12^{th}$ group compound such as $CdCl_2$ or $ZnCl_2$ with $16^{th}$ group compound such as $Na_2S$ or $Na_2Se$ under the presence of above mentioned polymer compound. This method can be applied to the combination of $13^{th}$ group and $15^{th}$ group. The semiconductor fine particles obtained in accordance to the above mentioned method has a peculiarity of quantum effect.

EXAMPLES

Example 1

Preparation of Stabilized Dispersion of Colloidal Gold Particles (Fine Particles) Using Auric Acid Chloride, acetal-PEG-SH and a Reducing Agent $NaBH_4$.

The generation of dispersion of colloidal gold particles (fine particles) is investigated regarding to the mixture prepared by using acetal-PEG-SH (Mn=3200) to 0.2 mM of auric acid chloride ($HAuCl_4$) in the ratio of $HAuCl_4$:acetal-PEG-SH (Au:PEG)=1:3, 1:1 and 1:1/6.

Approximately 10 times of sodium borohydride ($NaBH_4$) to $HAuCl_4$ is added to this line and reacted for 10 hours. UV and VL spectrums of before and after reaction are shown in FIG. 3. The results of FIG. 3 show that the absorbency at 400–600 nm is increased after reduction, and show the generation of colloidal particles. Further, the results of FIG. 3 indicate that the absorbency closed to longer wave length is increased, and this fact indicates that the particle size becomes bigger.

It is confirmed that the visible light transmittance does not change more than one day in phosphoric acid buffering solution (pH=6.8) at 0.15M ionic strength. Thus, it is confirmed that the much stabilized gold fine particles can be prepared in high ionic strength (FIG. 4).

Example 2

Preparation of Stabilized Dispersion of Colloidal Gold Particles (Fine Particles) Using Auric Acid Chloride, acetal-PEG/PAMA Block Copolymer (Mn of each Polymer is 5700/15700, n in Structural Formula A is 130, m is 100)

1 mL of aqueous solution of 2.5 mg/mL of auric acid chloride ($HAuCl_4$) (Au) and 5 mL of aqueous solution of 6 mg/mL acetal-PEG/PAMA block copolymer (N) (N:Au=8:1) are mixed together and stirred for 24 hours by the room temperature. UV·VL spectrum is measured at the prescript time. As clearly shown in FIG. 5, the peak of 540 nm originated to gold fine particles is increasing gradually, and the generation of the dispersion colloidal gold particles (fine particles) in the condition of not adding a reducing agent is confirmed. The solution is measured by using a light scattering (DLS: dynamic light scattering), and the generation of monodispersed colloidal particles (average particle size d=18.6 nm) shown in FIG. 6 is confirmed.

Further, the generation of perfectly homogeneous particles is confirmed by the observation using a transmission electron microscope. The pH of solution is changed in the region from 2 to 10, and it is confirmed that the spectrum does not change after left for one day. Namely, it is also confirmed that the very stabilized colloidal gold particles (fine particles) can be obtained in this line.

Still more, it is confirmed that the colloidal particles are existing stable, after NaCl thinner than 0.2M is added.

To said solution, 10 times equivalent weight of 1,2-diamino-4,5-dimethoxy2hydrochlorate (DDB) to block copolymer is added and pH is adjusted to 2.45 by NaCl. The said solution is dialyzed by a permeable membrane of fractionation molecular weight 500, and the fluorescence intensity is measured at excitation wave length of 269 nm. The strong fluorescence is observed at 410 nm. By this result, it is confirmed that the end acetal group of acetal-PEG/PAMA block copolymer of the surface of the prepared gold particles is transformed to aldehyde and reacted effectively with DDB. The obtained stabilized dispersion of colloidal gold particles is useful for the use of a diagnosis agent.

Example 3

Preparation of Stabilized Dispersion of Colloidal Cold Particles (Fine Particles) by Adding acetal-PEG/PAMA Block Copolymer to the Dispersion of Colloidal Gold Particles (Fine Particles) on the Market.

1.4 mg of above mentioned block copolymer (5700/15700) (mole ratio, Au/N=1/10000000) is weighted, dissolved in 2 mL of distilled water, then the pH is adjusted to 6.5 using HCl. 1.0 mL of colloidal solution of gold on the market (40 nm, $2 \times 10^{-8}$ mol, pH6.5) is added with constant stirring, and continuously stirred for 3 hours at the room temperature. After that, the pH is adjusted to 3 by adding HCl and stand for prescribed time, then VL spectrum is measured. As clearly understood from FIG. 8(a), that the peak of flocculation does not appear after 10 hours at pH 3.2, and the stable dispersion is formed (it is understood that the stable dispersion is formed, because there is no change of absorption wave length after 1, 2, 4, 6, 8 and 10 hours after initiation). FIG. 8(b) is a comparative case which uses PEG homo polymer. At pH 3.1, as understood from the absorption curves of after 30 minutes, 1, 2, 4, 6, 8 and 10 hours, the absorption wave length shifts to longer wave length side by the lapse of time and shows that the flocculation is progressed.

In above mentioned Examples, the concrete examples of polymer possessing acetal on it's end are illustrated. When acetal is replaced with other functional groups which has other function, for example, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, the detecting subject which combines with above mentioned functional groups can be detected.

Example 4

Preparation of CdS Quantum Dot

Acetal-PEG/PAMA block ($4.19\times10^{-7}$ mol), $CdCl_2$ ($6\times10^{-5}$ mol) and $Na_2S\cdot9H_2O$ ($6\times10^{-5}$ mol) are added and stirred for 20 minutes by a stirrer. Fluorescence of the obtained quantum dot (particle size 4 nm) is measured at excitation wavelength 300 nm, and as shown in FIG. 9, a strong fluorescence peculiar to semiconductor fine particles is observed.

Example 5

Synthesis of Polymer Contained in Graft Polymer Represented by Structural Formula B 1. Synthesis of Polyethyleneglycol Macromonomer Possessing a Vinylbenzyl Group on One End and a Carboxyl Group on Another End 30 mL of tetrahydrofuran (THF), 1 mmol of 4-vinylbenzylalchol (VBA), 1 mmol of potassium naphthalene and 113.5 mmol of ethyleneoxide (EO) are poured into 100 mL flask under argon flow and polymerized at the room temperature for 2 days. To the obtained solution, 5 mmol of succinic anhydride (sucAnh) is added and reacted another 1 hour. The generated polymer is purified by precipitating in isopropanol, filtrating and recovering, then by lyophilization with benzene. Polymer is obtained quantitatively, and according to the GPC analysis, the molecular weight of the polymer is 5000 and the molecular weight distribution is 1.06. And, it is confirmed by the analytical result of $^1$N-NMR that a vinylbenzyl group is introduced to one end and a carboxyl group is introduced on another end.

2. Synthesis of Graft Polymer Possessing an Amino Group on a Main Chain and PEG-COOH on a Side Chain Azobisisobutyronitlile (AIBN; 0.1 g), which is a polymerization initiator, PEG macromonomer (2 g) synthesized in above mentioned item 1 and N,N-dimethylaminoethylmethacrylate (AMA; 13 mmol) are poured into 100 mL flask under argon flow and reacted for 2 days at 60° C. It is confirmed from the analytical results of GPC and NMR that the graft polymer whose molecular weight is 64000, possessing an amino group and three or four PEGCOOH side chains is quantitatively synthesized.

3. Preparation of Fine Particles of Gold (Nano Size) using Graft Polymer Obtained in Item 2.

Using 100 mL flask, 0.16 g of the graft polymer synthesized in item 2 is dissolved into 4 mL of ultra pure water and $4\times10^{-3}$ g/mL of polymer aqueous solution is prepared. To 5 mL of said solution, aqueous solution of auric acid chloride ($HAuCl_4$) of prescribed quantity is added and stirred for one day. Plasmon absorption of gold at 520 nm is observed at the experiments of various mixing ratio, and the generation of fine particles of gold (nano size) is confirmed [(FIG. 10), a is the case when Au/N ratio is 1/8, b is 1/16, c is 1/32, d is 1/64 and e is 1/128].

By the observation of a transmission electron microscope, it is understood that the size of obtained fine particles of gold (nano size) is 6–8 nm and is monodispersed fine (nano) particles whose polydisperse grade is 1.08–1.10.

By the measuring result of ξ potential of the obtained fine (nano) particles, it is confirmed that a carboxylic acid is introduced at −10 mvolt surface potential at the pH=7.0.

4. Cohesion Test of Fine Particles (Nano Size) of Gold

In the aqueous solution prepared by blending acetal-PEG-SH and $HAuCl_4$ by 1/6:1 ratio, $NaBH_4$ of 10 times mol to $HAuCl_4$ is added and colloid of gold is prepared by reduction method. The end acetal group is treated by hydrochloric acid of pH2 so as to transform to aldehyde group, then reacted with p-aminophenyl-β-D-lactopyraniside and modified by lacto-PEG-SH and colloidal gold solution (average particle size: 8.7 nm) is obtained. To the colloidal gold-phosphoric acid buffering aqueous solution (pH is 7.4, I=0.15), RCA120 lectin (having galactose recognition specificity) of various concentration [FIG. 12, abscissa micromole (μmol/L)] are added, then absorbancy (specific absorbancy=$\Delta A/A_0$) after 3 hours (■), 8 hours (●) and 24 hours (▲) are measured (does not react with mannose ○, and indicates that there is galactose recognition specificity). When absorbancy changes are plotted to added lectin concentration, it is confirmed that the cohesion is re-dispersed by adding excess galactose at voluntary time, and recognized that the cohesion is the reversible cohesion.

INDUSTRIAL APPLICABILITY

As mentioned above, by the producing method of the present invention, the dispersion such as metal fine particles (colloidal particles, nano particles) or semiconductor quantum dots (fine particles which indicates quantum effect) having stabilized property which conventional dispersion of gold fine particles (colloidal particles, nano particles) does not have can be obtained, and this is an excellent effect of the present invention. Further, said dispersion has narrow particle dispersion and is the colloidal particles (fine particles, nano particles) whose particle size is smaller than 50 nm, has high stability and has a functional group (modified) at the surface layer. From said view points, this dispersion can be applied to various fields besides the medical diagnosis use.

What is claimed is:

1. A method of producing a stabilized dispersion of metal fine particles in an aqueous solution of R-PEG-SX comprising, fine particles of metal which is obtained by reducing at least one metallic acid or salt thereof selected from the group consisting of haloauric acid, haloplatinic acid, silver nitrate and halorhodic acid by a reducing agent, wherein, R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is polyethylene glycol having an average molecular weight of 300 to 20,000, X is H or pyridylthio group, and said fine particles load a polymer having PEG unit possessing above mentioned functional group on the surface.

2. A stabilized dispersion of metal fine particles in a block polymer solution of R-PEG-PAMA comprising, fine particles of metal which is obtained by reducing at least one metallic acid or salt thereof selected from the group consisting of haloauric acid, haloplatinic acid, silver nitrate and halorhodic acid, wherein, R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is polyethylene glycol having an average molecular weight of 300 to 20,000, PAMA is a polymer of acrylic acid or methacrylic acid possessing an amino group represented by structural formula A, structural formula A

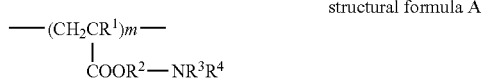

wherein, m indicates degree of polymerization and is 2–10000, $R^1$ is H or methyl group, $R^2$ is alkylene group of carbon number 1–10, $R^3$ and $R^4$ is alkyl group of carbon number 1–5, and said fine particles load a polymer having block polymer possessing above mentioned functional group on the surface.

3. A method for producing the stabilized dispersion of metal fine particles in the block polymer solution of R-PEG-PAMA of claim 2 comprising, reducing at least one metallic acid or salt thereof selected from the group consisting of haloauric acid, haloplatinic acid, silver nitrate and halorhodic acid, wherein R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is polyethylene glycol having an average molecular weight of 300 to 20,000, PAMA is a polymer possessing an amino group represented by structural formula A, and said fine particles load a block polymer possessing above mentioned functional group on the surface.

4. A stabilized dispersion of metal fine particles in a graft polymer solution of structural formula B comprising, fine particles of metal which is obtained by reducing at least one metallic acid or salt thereof selected from the group consisting of haloauric acid, haloplatinic acid, silver nitrate and halorhodic acid, structural formula B

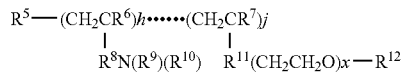

wherein, $R^{12}$ is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, $R^6$, $R^7$, $R^9$, $R^{10}$ is H or lower alkyl group of carbon number 1–5, $R^8$ and $R^{11}$ are respectively a bonding group selected independently from the group consisting of —COO(CH$_2$)$_y$—, wherein y is an integer of 1–10, —C$_6$H$_4$(CH$_2$)z—, wherein z is an integer of 1–10, and —CONH(CH$_2$)$_w$—, wherein w is an integer of 1–10, $R^5$ is a fragment of initiator generated at the synthesis, X indicates degree of polymerization and is 2–1000, h is 2–50000 and j is 1–10000, and said fine particles load said graft polymer chain possessing above mentioned functional group on the surface.

5. A method for producing the stabilized dispersion of metal fine particles in the graft polymer solution of structural formula B of claim 4 comprising, reducing at least one metallic acid or salt thereof selected from the group consisting of haloauric acid, haloplatinic acid, silver nitrate and halorhodic acid, structural formula B

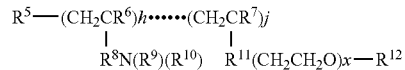

wherein, $R^{12}$ is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, $R^6$, $R^7$, $R^9$, $R^{10}$ is H or lower alkyl group of carbon number 1–5, $R^8$ and $R^{11}$ are respectively a bonding group selected independently from the group consisting of —COO(CH$_2$)$_y$—, wherein y is an integer of 1–10, —C$_6$H$_4$(CH$_2$)z—, wherein z is an integer of 1–10, and —CONH(CH$_2$)$_w$—, wherein w is an integer of 1–10, $R^5$ is fragment of polymerization initiator, X indicates degree of polymerization and is 2–1000, h is 2–50000 and j is 1–10000, and said fine particles load said graft polymer chain possessing above mentioned functional group on the surface.

6. The stabilized dispersion of metal fine particles according to any one of claim 2, or 4, wherein a halometallic acid or a salt thereof is selected from the group consisting of haloauric acid, haloplatinic acid, halorhodic acid and a salt thereof.

7. A stabilized dispersion of semiconductor fine particles in a solution of R-PEG-SX or block polymer of R-PEG-PAMA or graft polymer of structural formula B comprising, fine particles of semiconductor of MeS, CdSe or InAs obtained by heating at least one compound represented by MeX$_2$, wherein, Me is Cd or Zn and X is halogen, Na$_2$S, Se, Cd(CH$_3$)$_2$ and tributylphosphine under the presence of trioctylphosphineoxide, or by reacting (CH$_3$)$_3$SiAs, InCl$_3$ and trioctylphosphine by heating, in solution of polymer represented by R-PEG-SX, wherein, R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is polyethylene glycol having an average molecular weight of 300 to 20,000, X is H or pyridylthio group, or block polymer represented by R-PEG/PAMA, wherein, R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is polyethylene glycol having an average molecular weight of 300 to 20,000, PAMA is a polymer of acrylic acid or methacrylic acid possessing an amino group represented by structural formula A,

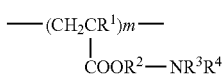   structural formula A wherein, m indicates degree of polymerization and is 2–10000, $R^1$ is H or methyl group, $R^2$ is alkylene group of carbon number 1–10, $R^3$ and $R^4$ is alkyl group of carbon number 1–5, or graft polymer represented by structural formula B,

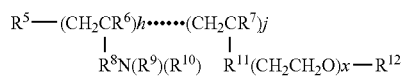   structural formula B wherein, $R^{12}$ is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, $R^6$, $R^7$, $R^9$, $R^{10}$ is H or lower alkyl group of carbon number 1–5, $R^8$ and $R^8$ are respectively a bonding group selected independently from the group consisting of —COO(CH$_2$)$_y$—, wherein y is an integer of 1–10, —C$_6$H$_4$(CH$_2$)z—, wherein z is an integer of 1–10, and —CONH(CH$_2$)$_w$—, wherein w is an integer of 1–10, $R^5$ is a fragment of initiator generated at the synthesis, X indicates degree of polymerization and is 2–1000, h is 2–50000 and j is 1–10000.

8. The stabilized dispersion of semiconductor fine particles of claim 7, wherein fine particles of semiconductor is CdS, CdSe, ZnS, ZnSe or InAs.

9. A method for producing the stabilized dispersion of semiconductor fine particles in a solution of block polymer represented by R-PEG-SX or R-PEG-PAMA or graft polymer of structural formula B of claim 7 comprising, heating at least one compound represented by MeX$_2$,
wherein, Me is Cd or Zn and X is halogen,
Na$_2$S, Se, Cd(CH$_3$)$_2$ and tributhylphosphine under the presence of trioctylphosphineoxide, or reacting (CH$_3$)$_3$SiAs, InCl$_3$ and trioctylphosphine by heating.

10. The method for producing the stabilized dispersion of semiconductor fine particles of claim 9, wherein fine particles of semiconductor is CdS, CdSe, ZnS, ZnSe or InAs.

11. A method of producing a stabilized dispersion of metal fine particles in an aqueous solution of R-PEG-SX comprising,
fine particles of metal which is obtained by reducing at least one metallic acid or salt thereof selected from the group consisting of haloauric acid, haloplatinic acid, silver nitrate and halorhodic acid by a reducing agent,
wherein, R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is polyethylene glycol having an average molecular weight of 300 to 20,000, X is H or pyridylthio group,
and said fine particles load a polymer having PEG unit possessing above mentioned functional group on the surface,
wherein a halometallic acid or a salt thereof is selected from the group consisting of haloauric acid, haloplatinic acid, halorhodic acid and a salt thereof.

12. A method for producing the stabilized dispersion of metal fine particles in the block polymer solution of R-PEG-PAMA comprising,
reducing at least one metallic acid or salt thereof selected from the group consisting of haloauric acid, haloplatinic acid, silver nitrate and halorhodic acid,
wherein R is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, PEG is polyethylene glycol having an average molecular weight of 300 to 20,000, PAMA is a polymer possessing an amino group represented by structural formula A,
and said fine particles load a block polymer possessing above mentioned functional group on the surface,
wherein a halometallic acid or a salt thereof is selected from the group consisting of haloauric acid, haloplatinic acid, halorhodic acid and a salt thereof.

13. A method for producing the stabilized dispersion of metal fine particles in the graft polymer solution of structural formula B comprising, reducing at least one metallic acid or salt thereof selected from the group consisting of haloauric acid, haloplatinic acid, silver nitrate and halorhodic acid,

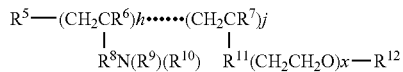   structural formula B wherein, $R^{12}$ is a functional group selected from the group consisting of acetal, aldehyde, hydroxyl group, amino group, carboxyl group, active ester group, azide group, biotin group, monosaccharide, oligosaccharide, amino acid, nucleic acid, allyl group, vinyl benzyl group, methacryloyl group and acryloyl group, $R^6$, $R^7$, $R^9$, $R^{10}$ is H or lower alkyl group of carbon number 1–5, $R^8$ and $R^{11}$ are respectively a bonding group selected independently from the group consisting of —COO(CH$_2$)$_y$—, wherein y is an integer of 1–10, —C$_6$H$_4$(CH$_2$)z—, wherein z is an integer of 1–10, and —CONH(CH$_2$)$_w$—, wherein w is an integer of 1–10, $R^5$ is fragment of polymerization initiator, X indicates degree of polymerization and is 2–1000, h is 2–50000 and j is 1–10000,
and said fine particles load said graft polymer chain possessing above mentioned functional group on the surface,
wherein a halometallic acid or a salt thereof is selected from the group consisting of haloauric acid, haloplatinic acid, halorhodic acid and a salt thereof.

* * * * *